Oct. 29, 1963   M. B. ROYCE   3,108,731
CONTAINER FOR FRUITS, VEGETABLES AND THE LIKE
Filed Dec. 28, 1960   2 Sheets-Sheet 1
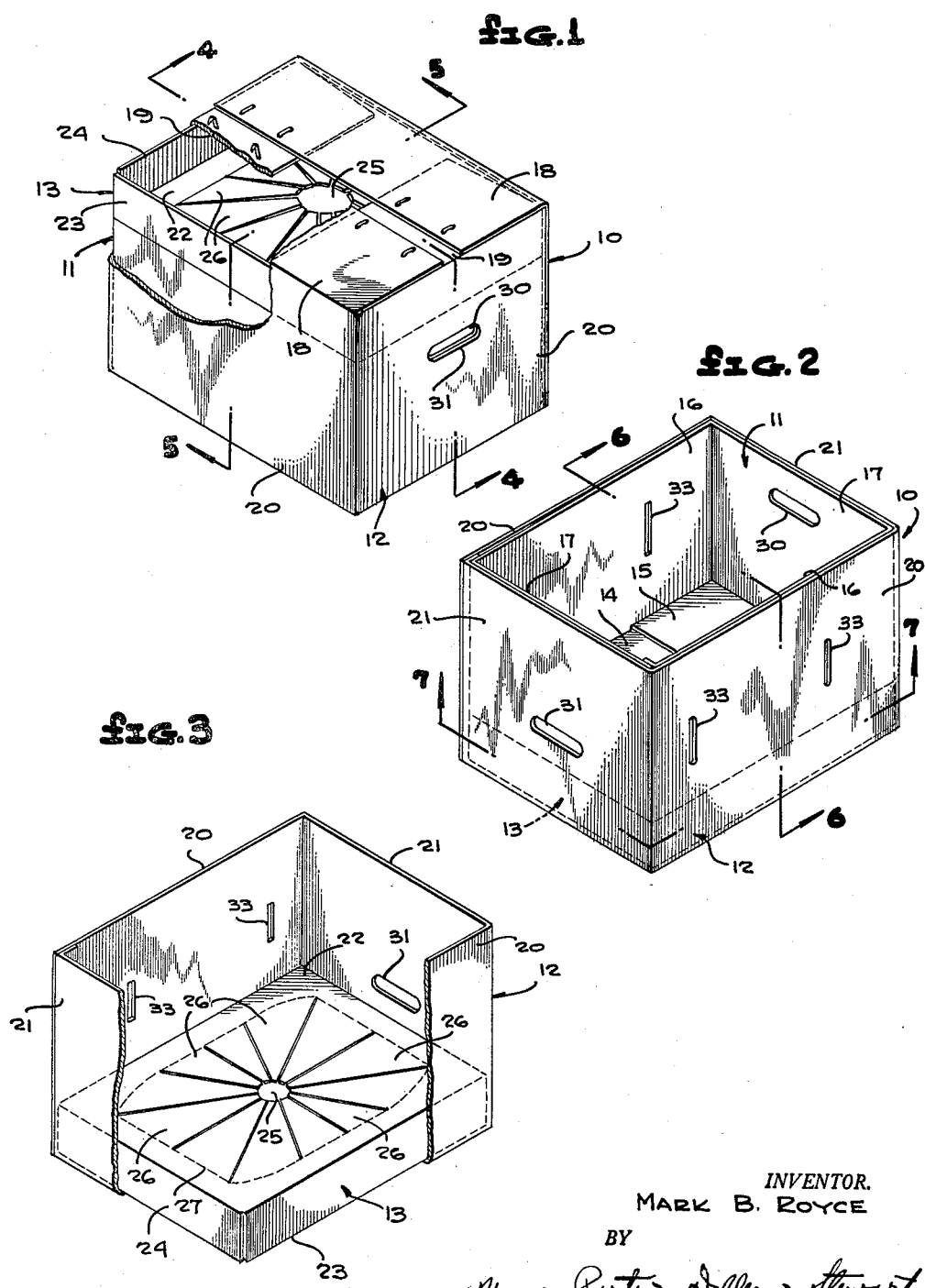
INVENTOR.
MARK B. ROYCE
BY
ATTORNEYS Oct. 29, 1963 M. B. ROYCE 3,108,731
CONTAINER FOR FRUITS, VEGETABLES AND THE LIKE
Filed Dec. 28, 1960 2 Sheets-Sheet 2
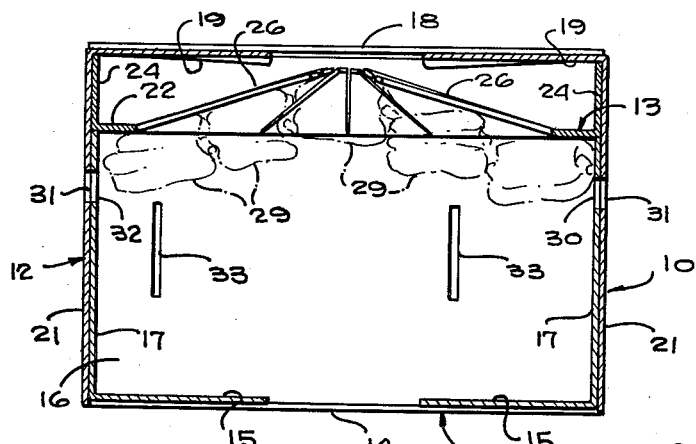
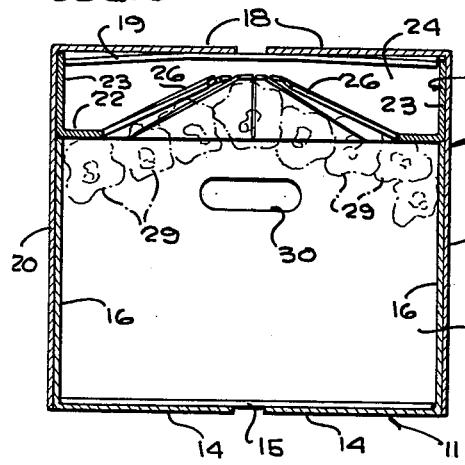
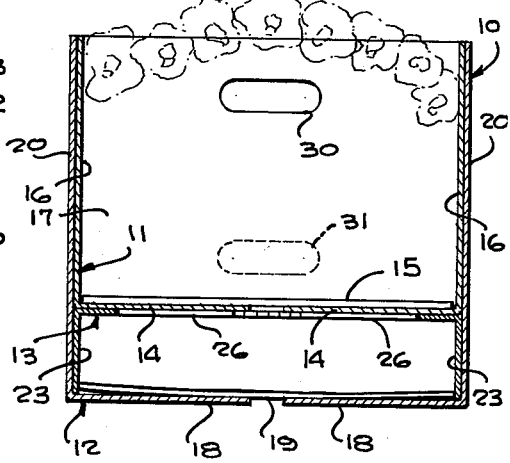
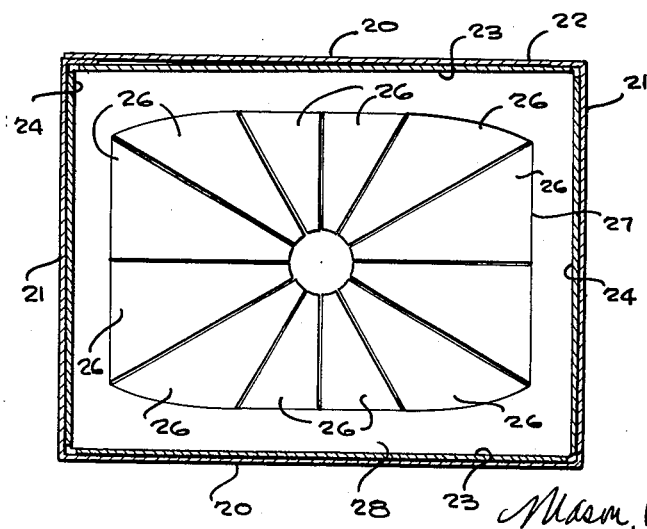
INVENTOR.
MARK B. ROYCE
BY
Mason, Porter, Diller & Stewart
ATTORNEYS

# United States Patent Office 3,108,731
Patented Oct. 29, 1963

3,108,731
CONTAINER FOR FRUITS, VEGETABLES
AND THE LIKE
Mark B. Royce, Hohokus, N.J., assignor to Continental
Can Company, Inc., New York, N.Y., a corporation of
New York
Filed Dec. 28, 1960, Ser. No. 78,912
11 Claims. (Cl. 229—14)

This invention relates in general to new and useful improvements in container constructions, and more particularly relates to a novel container particularly intended for packaging vegetables, fruits and the like, and is primarily intended for the packaging of fresh peppers.

The primary object of this invention is to provide a novel container which includes the usual box and telescoping cover wherein the box may be filled to overflowing and the cover, when telescoped over the box will primarily rest upon the box so as to not place undue pressure on the vegetables or fruits projecting above the top edge of the box.

Another object of this invention is to provide a novel container for packaging vegetables and fruits wherein the vegetables or fruits are disposed in a box with the quantity thereof being sufficient to overflow the box and be piled above the upper edges of the box, the container also including a cover corresponding generally in cross section to the box and being telescoped down thereover, the cover being of a construction wherein the vegetables or fruits projecting above the box are lightly engaged in a cushioned manner to prevent bruising of the vegetables or fruits, and at the same time movement of the vegetables or fruits relative to the box is prevented.

Still another object of this invention is to provide a novel container particularly adapted for packaging vegetables and fruits in a box under overflowing conditions, the container also including a cover normally telescoped over the box, the upper portion of the cover having a filler therein intended to rest upon upper edges of the box and having a central portion which may be readily deflected upwardly by vegetables or fruits which are piled in the box in overflowing relation, the filler box cushioning the effects of the cover on the upwardly projecting vegetables or fruits, and serving to hold the vegetables or fruits in an overflowing relation with respect to the box.

A further object of this invention is to provide a novel filler which may be placed within a cover for a box, the filler being intended to be mounted in the upper portion of a cover which is of a greater height than its associated box, and the filler having a wall with a plurality of radiating fingers formed in the central portion thereof, which fingers may deflect when engaged by vegetables or fruits piled to overflowing in an associate box to provide the necessary cushion for the vegetables or fruits and simultaneously serving to retain the vegetables or fruits in place.

Still another object of this invention is to provide a novel container for vegetables or fruits, particularly peppers, wherein the vegetables or fruits may be packaged in a box to overflowing, and at the same time may be covered utilizing a cover which telescopes over the box so as to prevent damage to the vegetables or fruits and at the same time to retain them in the box, the cover further being adapted to be used as part of a display for the filled container by inverting the cover and telescoping the box bottom first within the cover, at which time the box upper edges will be disposed substantially co-planar with the cover upper edges and the overflowing fill in the box will be readily displayed.

A still further object of this invention is to provide a novel cover for a box which may be used in conjunction with the box when it is filled to overflowing, the cover being provided in the upper portion thereof with a filler which includes a wall and upstanding peripheral flanges, the cover including a top formed of a plurality of flaps disposed in overlying crossing relation and suitably secured together, and at least certain of the flanges of the filler being engaged between edges of the flaps and the depending side walls of the cover to form an interlock between the filler and the cover and thus retain the filler within the cover.

With the above and other objects in view that will hereinafter appear, the nature of the invention will be more clearly understood by reference to the following detailed description, the appended claims and the several views illustrated in the accompanying drawings.

In the drawings:

FIGURE 1 is a perspective view of the complete container and shows the cover is telescoped relation with respect to the box, the upper portion of the cover being broken away to show the general details of the filler carried thereby.

FIGURE 2 is a perspective view showing the cover in an inverted position with the box telescoped bottom first therein.

FIGURE 3 is an inverted perspective view of the cover with portions thereof being broken away to show further the specific details of the filler and the relationship thereof with respect to the cover.

FIGURE 4 is an enlarged vertical sectional view taken along the line 4—4 in FIGURE 1 and shows the container as it would appear with a fill therein, the fill being diagrammatically illustrated as peppers in phantom lines.

FIGURE 5 is an enlarged transverse sectional view taken along the line 5—5 of FIGURE 1 and shows further the details of the container.

FIGURE 6 is an enlarged transverse sectional view taken along the line 6—6 of FIGURE 2 and shows specifically the relationship of the components thereof, the fill also being shown in phantom lines.

FIGURE 7 is an enlarged horizontal sectional view taken along the line 7—7 of FIGURE 2 and shows the specific details of the construction of the filler and the relationship thereof with respect to the cover.

Referring now to the drawings in detail, it will be seen that there is illustrated the container which is the subject of this invention, the container being generally referred to by the numeral 10. The container is basically of a three-part construction and includes a box, generally referred to by the numeral 11, a cover, generally referred to by the numeral 12, and a filler, generally referred to by the numeral 13. In use, as is best shown in FIGURES 4 and 5, the filler 13 is carried in the upper portion of the cover 12 and the cover 12 is fully telescoped down over the box 11.

The box 11 is of a conventional construction and includes a generally rectangular bottom which is formed by a pair of longitudinally extending flaps 14 which underlie a pair of transversely extending flaps 15, the flaps 14 and 15 being suitably secured to one another. The box 11 also includes a pair of longitudinally extending upstanding walls 16 to which the flaps 14 are connected, and a pair of transversely upstanding walls 17 to which the flaps 15 are connected.

The cover 12 is a similar construction to the box 11, but is slightly larger than the box 11 in cross section and, when in use, is inverted as compared to the box 11. The cover 12 includes a top formed by a pair of longitudially extending flaps 18 which overlie a pair of transversely extending flap 19, the flaps 18 and 19 being suitably secured to one another. The cover 12 also includes a pair of depending longitudinal side walls 20 to which the flaps 18 are connected and a pair of depending transverse side walls 21 to which the flaps 19 are connected.

The side walls 20 and 21 of the cover 12 combine to define an opening of a size to readily receive the box 11 with the side walls 16 engaging the side walls 20 and the side walls 17 engaging the side walls 21. It is to be noted that the side walls 20, 21 are much longer than the side walls 16, 17 with the result that the cover 12 has a greater height than the box 11. The filler 13, which is disposed in the upper portion of the cover 12 decreases the internal height of the cover 12 to the point that the internal height of the cover 12 is substantially equal to the box 11.

The filler 13 includes a filler wall 22 which is disposed in spaced parallel relation to the top of the cover 12 and corresponds in cross section to the cross section of the cover 12 so that it completely fills the space defined by the side walls 20, 21.

The filler 13 also includes a pair of longitudinally extending flanges 23 and a pair of transversely extending flanges 24 which extend upwardly from the peripheral edges of the filler wall 22. The flanges 23 are disposed closely adjacent the side walls 20 while the flanges 24 are disposed closely adjacent the side walls 21.

Particular reference is now made to FIGURE 5 wherein it is shown that the upper edges of the flanges 23 extend alongside the ends of the flaps 19 and abut directly against the undersides of the flaps 18. Thus, the flaps 19 serve to wedge upper portions of the flaps 23 outwardly against the side walls 20 and retain the filler 13 within the upper portion of the cover 12.

Reference is now made to FIGURES 3 and 7 in particular wherein it is shown that the filler wall 22 has a central opening 25 which is illustrated as being circular in outline, but which may be of other configurations. A plurality of fingers 26 radiate outwardly from the central opening 25 in a generally sunburst pattern and are integrally connected to outer portions of the filler wall 22 along a peripheral fold line 27. It is to be noted that the filler wall 22 has a definite border portion, referred to by the numeral 28, surrounding the fold line 27.

It is intended that the container 10 be used in packaging various fills so that the fill will overflow the box 11 and be piled up in the center of the box 11 at the top thereof and above the upper edges thereof. This fill, of course, may be of any type, but normally will be vegetables or fruits. The container 10 is particularly adapted for the shipment of fresh peppers. As is best illustrated in FIGURES 5 and 6, when the container is filled with the fill 29, the fill projects upwardly above the upper edges of the box 11. When the cover 12 is placed on the box 11, the outer edge portion of the filler wall 22 will abut against the upper edges of the box 11 wherein any load placed on the cover 12 will be transferred by the filler 13 to the side walls 16, 17 of the box 11 and not primarily against the upwardly projecting fill 29. On the other hand, that portion of the fill 29 which is piled up in the center of the top of the box 11 will engage the numerous fingers 26 and will move the fingers 26 upwardly towards the top of the cover, as is best shown in FIGURES 4 and 5, with the fingers being resiliently flexed along the fold line 27. The fingers 26 will thus form a cushion for the fill 29 and serve to retain the upper portion of the fill 29 in place.

Inasmuch as the combined heights of the box 11 and the filler 13 are substantially equal to the internal height of the cover 12, it will be apparent that when it is desired to display the fill 29, it is merely necessary to invert the cover 12 after it has been removed from the box and to telescope the box 11 into the inverted cover 12 with the box 11 resting upon the filler 13. At this time the box 11 appears to completely fill the cover 12 and gives the illusion that the over-all contents of the box 11 is actually greater than it is.

Reference is now made to FIGURE 4 in particular, wherein it is shown that the side walls 17 and 21 are provided with aligned hand holes 30, 21, respectively, which will facilitate the handling of the container 10 while assuring against the separation of the box 11 and the cover 12. Also, the side walls 16 and 20 may be provided with aligned openings 33 for the purpose of ventilating the interior of the container 10.

From the foregoing, it will be readily apparent that there has been devised an extremely simple container which is of the normal type of construction except for the filler, and the construction permits the usual box to be filled to overflowing, thereby greatly enhancing the appearance of the filled box and making the item more readily saleable. Further, the construction of the container affords for the safe packaging of a readily perishable vegetable or fruit in a manner to prevent bruising and at the same time in a manner to hold the vegetable or fruit, for example, in its overflowing relation in the box 11.

It will be readily apparent that novel and advantageous provisions have been made for carrying out the desired end. However, attention is directed to the fact that variations may be made in the example container construction disclosed herein without departing from the spirit and scope of the invention, as defined in the appended claims.

What is claimed as new:

1. A container for vegetables, fruits and the like of the type including a box and a cover thereover and wherein it is desired to fill the box to overflowing, said box including a bottom, upstanding peripheral side walls and an open top and said cover including a top and depending side walls, and a filler disposed entirely within said cover adjacent said top, said filler having a wall disposed parallel to said top and spaced therefrom with a central portion of said filler wall being displaceable towards said top.

2. The container of claim 1 wherein the height of said box is less than the height of said cover, and the combined heights of said box and said filler being generally equal to the height of said cover.

3. The container of claim 1 wherein said filler wall central portion is formed of a plurality of radiating fingers.

4. The container of claim 1 wherein said filler wall has a central opening and said central portion includes a prurality of fingers radiating from said central opening in a generally sun burst design.

5. A container for vegetables, fruits and the like of the type including a box and a cover thereover and wherein it is desired to fill the box to overflowing, said box including a bottom and upstanding side walls and said cover including a top and depending side walls, and a filler disposed within said cover adjacent said top, said cover top being formed of outer flaps and inner flaps secured together, and said filler having a lower wall disposed parallel to said top and spaced therefrom and at least two oppositely disposed upstanding flanges having upper edge portions clamped between ends of said inner flaps and said cover side walls, said filler wall including a central portion displaceable towards said top.

6. The container of claim 5 wherein said filler wall central portion is formed of a plurality of radiating fingers.

7. The container of claim 5 wherein said filler wall has a central opening and said central portion includes a plurality of fingers radiating from said central opening in a generally sun burst design.

8. A cover assembly particularly adapted for use with a box filled to overflowing, said cover assembly comprising a box cover and a filler, said cover including a top and depending side walls, said filler being fully telescoped within said cover adjacent said top and having a wall disposed in spaced parallel relation to said top, said filter wall having a central portion, said central portion being constructed and arranged for displacement towards said top, and cooperating means retaining said filler within said cover when said cover is in its normally downwardly opening position.

9. The container of claim 8 wherein said filler wall central portion is formed of a plurality of radiating fingers.

10. The container of claim 8 wherein said filler wall has a central opening and said central portion includes a plurality of fingers radiating from said central opening in a generally sun burst design.

11. A cover assembly particularly adapted for use with a box filled to overflowing, said cover assembly comprising a box cover and a filler, said cover including a top and depending side walls, said top being formed by inner and outer flaps secured together, said filler being fully telescoped within said cover and including a wall in spaced parallel relation to said top and flanges engaging said side walls and abutting against said top, certain of said flanges having upper edge portions clamped between ends of said inner flaps and adjacent ones of said side walls, and said filler wall having a central portion displaceable towards said top.

References Cited in the file of this patent

UNITED STATES PATENTS

| | | |
|---|---|---|
| 1,146,515 | Potter | July 13, 1915 |
| 1,608,422 | Plass | Nov. 23, 1926 |
| 1,625,620 | Maston | Apr. 19, 1927 |
| 1,935,923 | Thoke | Nov. 21, 1933 |
| 2,004,614 | Meagher | June 11, 1935 |
| 2,315,094 | Rehfield et al. | Mar. 30, 1943 |
| 2,531,090 | Turner | Nov. 21, 1950 |
| 2,540,595 | Props | Feb. 6, 1951 |
| 2,895,541 | Spivack | July 21, 1959 |
| 2,936,239 | Rendall | May 10, 1960 |
| 3,005,717 | Pilibos | Oct. 24, 1961 |

FOREIGN PATENTS

| | | |
|---|---|---|
| 406,511 | Great Britain | Mar. 1, 1934 |
| 452,143 | Great Britain | Aug. 12, 1936 |